United States Patent [19]

Goldin et al.

[11] 4,297,739
[45] Oct. 27, 1981

[54] DEVICE FOR EXCITING SYNCHRONOUS MACHINE

[76] Inventors: Rodion G. Goldin, ulitsa Mamina-Sibiryaka, 8, kv. 56; Valentin G. Yakimenko, ulitsa Taganskaya, 48, kv. 89, both of Sverdlovsk, U.S.S.R.

[21] Appl. No.: 62,177

[22] Filed: Jul. 30, 1979

[51] Int. Cl.³ .................. H02H 7/06; H02H 7/09
[52] U.S. Cl. .................... 361/55; 322/68; 361/56; 361/91
[58] Field of Search ............ 361/55, 57, 56, 91, 361/23, 31, 33, 58, 100, 104, 21; 322/59, 68, 69, 70, 73, 72, 81, 83

[56] References Cited

U.S. PATENT DOCUMENTS

| | | | |
|---|---|---|---|
| 3,215,896 | 11/1965 | Shattuck et al. | 361/55 |
| 3,314,001 | 4/1967 | Brockman | 322/68 X |
| 3,475,653 | 10/1969 | Odenberg et al. | 361/55 |
| 4,118,749 | 10/1978 | Matuzaki et al. | 322/68 X |

OTHER PUBLICATIONS

Vershinin, et al. (Employment of Synchronous Electric Drives in Metallurgy) Moscow, Metallurgia Publishers, 1974, pp. 124 and 130.
Exciters TE 8-320/5, Catalogue No. 05.03.145-77, Informelectro Publishers, pp. 4-5.

Primary Examiner—Patrick R. Salce
Attorney, Agent, or Firm—Lackenbach, Lilling & Siegel

[57] ABSTRACT

A device for exciting a synchronous machine, comprises an exciter electrically connected to an exciting winding of the synchronous machine, a starting unit connected in parallel with the exciter and comprising at least one branch having a resistor and a thyristor switch placed in series. The control circuit of the thyristor switch has a threshold element. A protective thyristor is placed parallel to the branch of the starting unit and its control electrode is connected via the commutator of a current sensor of the starting unit branch to the control circuit of the protective thyristor. A safety device is inserted in series into the starting unit branch circuit.

4 Claims, 3 Drawing Figures

DEVICE FOR EXCITING SYNCHRONOUS MACHINE

FIELD OF THE INVENTION

The present invention relates to electrical engineering and, in particular, to devices for exciting synchronous machines.

The invention can be employed for excitation of synchronous machines and in starting systems, circuits for overvoltage protection of the exciting winding, and field discharge units of synchronous machines.

DESCRIPTION OF THE PRIOR ART

Known in the art are devices for excitation of synchronous machines (cf., for example, P. P. Vershinin and L. Ya. Hashper "Employment of Synchronous Electric Drives in Metallurgy"/in Russian/, Moscow, Metallurgy Publishers, 1974, p. 130), comprising an exciter electrically connected to the exciting winding. Placed parallel to the output of the exciter is a starting unit comprising a resistor and a thyristor switch connected in series. The starting unit may be made up two or more parallel branches, each having a resistor and a thyristor switch. As a rule the thyristor switch control circuit comprises a threshold element which is voltage operated, for example, a voltage regulator tube.

As a synchronous machine, for example a synchronous motor, is started, the thyristor switch connects the resistor parallel to the motor exciting winding. Here much better starting characteristics of the motor are obtained as well as better protection of the exciting winding and the excitor against overvoltages.

In case overvoltages occur in the exciting winding of the synchronous machine (for example, during asynchronous operation), a control pulse passes through the threshold element placed in the control circuit of the thyristor switch. The thyristor switch is driven into conduction and connects the resistor parallel to the exciting winding thus damping the overvoltages.

The resistance of such a resistor normally exceeds that of the exciting winding by a factor of from 2 to 10 in order to ensure an adequate starting torque during motor starting, as well as to restrict overvoltages.

The magnitude of current flowing through the resistor and thyristor switch during the motor starting is comparable to the nominal exciting current. The duration of such current depends upon the starting process and does not usually exceed several seconds. At the end of the starting period (motor pulling into step) the thyristor switch cuts off the resistor and in normal operation, therefore, no current flows through the resistor.

In case the thyristor switch is damaged, however, there might be a flow of current through the resistor in the process of normal motor operation. As a result, losses grow and the thermal balance of the equipments upset in the exciting system. As no information is available on the fact that current flows through the resistor for a long time, an accident prone situation might develop and the emergency cutoff procedure is used to disconnect the motor from the power source.

Known in the art is a device for exciting a synchronous motor (cf., for example, "Exciters TE 8-320/5", Catalogue 05.03.145–77, Informelectro), which comprises an exciter, a starting unit connected parallel to the output of the exciter and composed of a resistor and a thyristor switch placed in series and a current sensor of the starting unit, having a delayed-action commutator.

In the known device the current sensor comprises a current relay, an electronic time relay and an output relay. The current relay is inserted into the starting unit circuit, whereas the contacts of the current relay are connected into the control circuit of the electronic time relay.

As the contacts of the current relay are closed, the electronic time relay switches on the output relay with a specific time delay.

In this way the current sensor of the starting unit ensures information on any fault in the operation of the starting unit, which permits prevention of further damage. But this is possible only by disconnecting the exciting system and, consequently, the synchronous motor from the mains.

In the known device, therefore, any fault of the thyristor switch can disable the exciting device and the motor.

SUMMARY OF THE INVENTION

The object of the invention is to improve the reliability of operation of a device for exciting of a synchronous machine.

Another object of the invention is further improvement of reliability of operation of a device for exciting a synchronous machine by preventing overvoltages in the exciting winding of the synchronous machine.

The invention consist of a device for exciting a synchronous machine, comprising an exciter electrically connected to an exciting winding of the synchronous machine, a starting unit connected parallel to the exciter and comprising at least one branch composed of a resistor and a thyristor switch placed in series, the control circuit of said thyristor switch having a voltage actuated threshold element, and a current sensor of the starting unit branch, which is equipped with a delayed-action commutator. According to the invention, a safety device is connected in series into the circuit of the starting unit branch, a protective thyristor is connected parallel to the starting unit branch and a protective thyristor control unit is connected to the control electrode of said thyristor via the delayed-action commutator of the current sensor of the starting unit branch.

It is desirable that in a device for exciting a synchronous machine, according to the invention, the control unit of the protective thyristor is the resistor of the starting unit branch in order to simplify the control unit of the protective thyristor and to insure self-contained operation of the device.

It is preferable in a device for exciting a synchronous machine, according to the invention, for a field discharge contactor is to be included into the exciting winding circuit. One output is connected to the safety device of one branch, and the other output is connected to the adjoining branch of the starting unit in order to expand functional capabilities of this starting unit.

BRIEF DESCRIPTION OF THE DRAWINGS

Other object and advantages of the present invention will become apparent from the following detailed description of preferred embodiments thereof, taken in conjunction with the accompanying drawings, wherein.

DETAILED DESCRIPTION OF THE INVENTION

Figure 1:
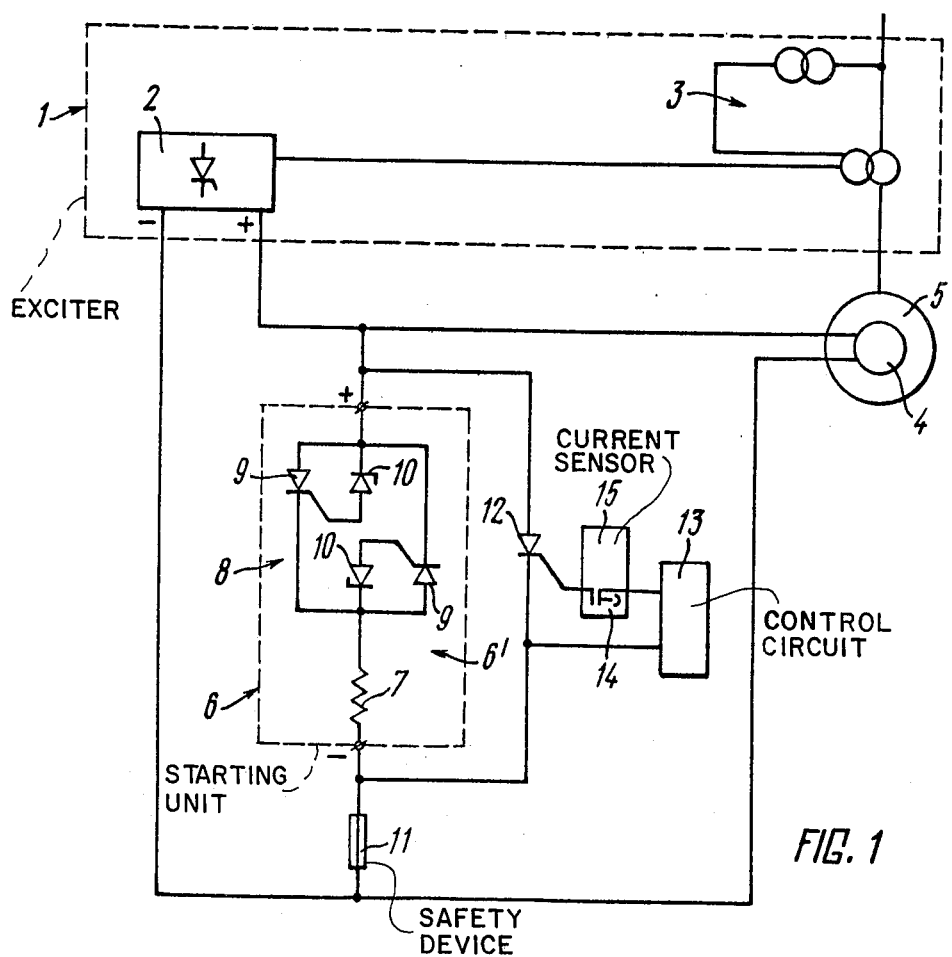
FIG. 1 is a schematic diagram of a device for exciting a synchronous machine, according to the invention.

FIG. 1 illustrates a schematic diagram of a device for exciting a synchronous machine.

A device for exciting a synchronous machine comprises an exciter 1 usually composed of a thyristor converter 2 and a group of transformers 3. The exciter 1 is intended for feeding an exciting winding 4 of a synchronous machine 5 with an automatically adjusted direct current. A starting unit 6 is connected parallel to the input of the exciter 1, which is intended for starting the synchronous machine 5 and protecting the exciting winding 4 and the exciter 1 from overvoltages. The starting unit 6 has at least one branch 6' made up of two series-connected elements: a resistor 7 and a thyristor switch 8 composed of two thyristors 9 connected in antiparallel. The control circuit of each thyristor 9 has a threshold element 10 which is voltage actuated, for example, a VR tube. In order to make the thyristor 9 nonconductive in the normal operating conditions of the synchronous machine 5 it is necessary that the voltage setting (that is the actuating voltage of the VR tube) be fixed higher than the supply voltage. A safety device 11 is inserted in series in the circuit of the branch 6' of the starting unit 6 and a protective thyristor 12 is placed parallel to the branch 6' of the starting unit 6. The protective thyristor 12 and the safety device 11 are designed for cutting the starting unit 6 off in case of any fault therein. A control circuit 13 is inserted in the control circuit of the protective thyristor 12 and connected to the control electrode of the protective thyristor 12 via a delayed-action commutator 14 of a current sensor 15 of the branch of the starting unit 6 (in this case the commuator is a contact).

In the abovementioned diagram the current sensor 15 of the branch of the starting unit 6 and the commutator 14 are made as one device—a thermal time relay comprising a thermal contactor equipped with a thermal delay device, which is placed upon the resistor 7 and controls the heat generated when current flows through the branch 6' of the starting unit 6.

Other embodiments of the current sensor 15 are possible. For example, there may be used such principles as direct control of current in the branch 6' of the starting unit 6, or control of the magnetic field produced by such current, or control of the voltage drop in some element of the branch 6' of the starting unit 6, or the principle of photoeffect, or others. The commutator 14 can be any device insuring the flow of current from the control circuit 13 towards the control electrode of the protective thyristor 12, for example, a relay contactor, a transistor, a thyristor and the like.

Time delay can be obtained by using a time relay, a capacitor charge or discharge effect, the thermal inertia effect and the like.

The control circuit 13 of the protective thyristor 12 can be embodied in any way as soon as it insures the flow of current of a specific shape and power along the circuit "control electrode—cathode" of the protective thyristor 12 when the commutator 14 of the current sensor 15 operates.

It should be noted, however, that the starting unit 6 may comprise several parallel branches 6' composed of series-connected resistors 7 and thyristor switches 8. In this case each parallel branch 6' should have a safety device 11 and a protective thyristor 12. The control circuit 13 can be both individual for each branch and common for all branches. The current sensor 15 in this embodiment should be provided for each branch 6'.

Figure 2:
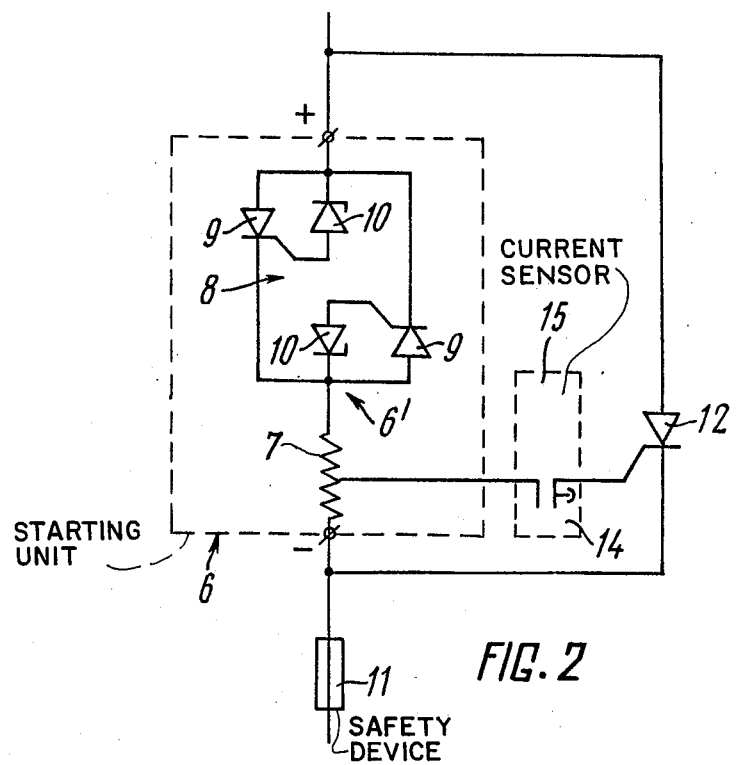
FIG. 2 is a schematic diagram of a control circuit of a protective thyristor, according to the invention.

The embodiment of the control circuit of the protective thyristor 12 illustrated in FIG. 2 differs from the embodiment of FIG. 1 in that here the control circuit 13 of the thyristor 12 is the resistor 7 of the branch 6' of the starting unit 6, which insures voltage in the control circuit of the protective thyristor 12 when current flows in said branch 6' of the starting unit 6 through the closed commutator 14.

Figure 3:
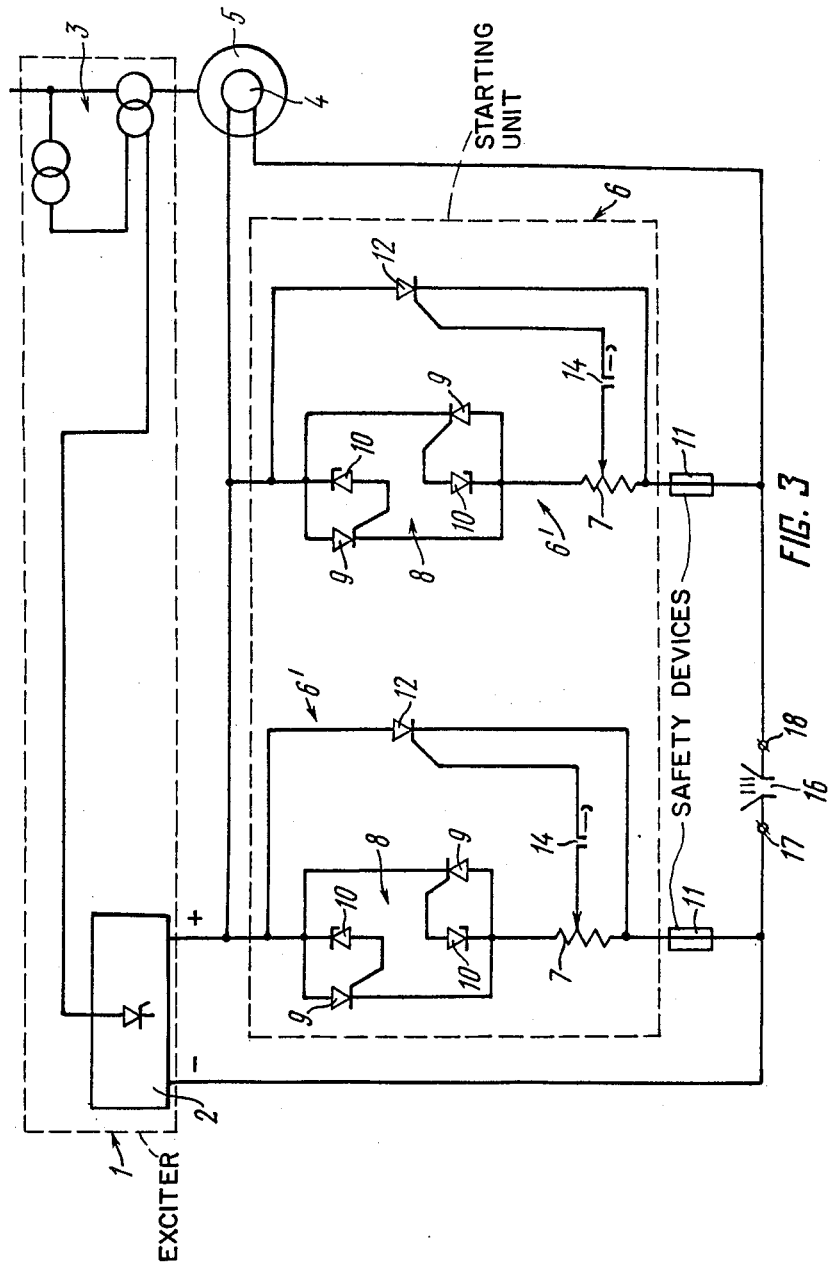
FIG. 3 shows a connection diagram of a field discharge contactor, according to the invention.

The embodiment of a device for exciting a synchronous machine of FIG. 3 differs from the embodiments of FIGS. 1 and 2 in that here a field discharge contactor 16 is inserted into the circuit of the exciting winding 4. One output 17 of said contactor 16 is connected to the safety device 11 of one branch 6', whereas the other output 18 is connected to the safety device 11 of an adjacent branch 6' of the starting unit 6. It should be pointed out that there might be several such branches 6' depending on the power of the starting device and criteria of reliability. In this case protection is provided even if one of the additional branches is disconnected.

The contactor 16 for field discharge is intended for intensified discharge of the field of the synchronous machine 5 in case of internal short circuiting in the synchronous machine 5 by maintaining a permanent arc voltage on its opened contacts.

In this case the extreme right branch 6' of the starting unit 6 is intended for protection of the exciting winding 4 of the synchronous machine 5 from overvoltages in case of discontinuity of the arc of the contactor 16 and presence of some residual electromagnetic energy in the exciting winding 4. The threshold elements 10 (the same VR tube in this case) of the thyristors 9 of said branch 6' have the same voltage actuation setting as the voltage actuation setting of the threshold elements 10 of the other branches 6' of the starting unit 6 and said branch 6', therefore, operates in starting conditions and all other aforementioned conditions together with other branches 6' of the starting unit 6, the field discharge contactor 16 being closed.

The device for exciting a synchronous machine operates as follows.

The synchronous machine 5 (FIG. 1) is brought up to a nominal speed of rotation in accordance with a specific program which is commonly known and is not explained here. Then current from the exciter 1 is supplied to the exciting winding 4, its magnitude depending upon the load of the synchronous machine 5.

In this mode of operation of the synchronous machine 5 the voltage at the output of the exciter 1 is less than the actuating voltage of the threshold element 10 and no control pulse is generated in the thyristors 9. The thyristors 9 of the thyristor switch 8 are nonconductive. And the starting unit 6 is cut off.

During the transient operating conditions of the synchronous machine 5, involving overvoltages in the exciting winding 4 of the synchronous machine 5 (for example, asynchronous operation, starting of the synchronous machine, connection of the generator to the mains by self-synchronization method and others), if voltage in the exciting winding 4 or at the outputs of the exciter 1 becomes higher than the setting of the threshold element 10, current flows in the control circuit of the thyristor 9. The thyristor 9 becomes conductive and connects the resistor 7 parallel to the exciting winding 4, thus reducing the voltage in the exciting winding 4 to the value determined by the parameters of the synchronous machine 5 and of the resistor 7.

If two or more parallel branches 6' of the starting unit 6 are switched on according to the embodiment of FIG. 3, all parallel branches 6' of the starting unit 6 are connected to the exciting winding 4 in the above mentioned transient operating conditions, thus lowering the overvoltage.

The starting unit 6 is cut off by the known method, for example, through the control system of the exciter 1.

During emergency conditions, when the synchronous machine 5 has an exciting system as in FIG. 3, the contactor 16 contributes to intensified discharge of the field of the synchronous machine 5, which is necessary to curb further development of the accident.

This is achieved by maintaining a permanent arc voltage on the opened contacts of the contactor 16.

In some cases, for example incomplete disconnection of phases during cutoff of the synchronous machine 20 from the mains, arc extinction may occur before the electromagnetic energy of the field of the synchronous machine 5 is discharged fully. The winding 4 in this case is subjected to severe overvoltage. When such overvoltage is larger than the actuating voltage setting of the threshold element 10 of the thyristor switch 8, the thyristors 9 of the extreme right branch 6' are turned on as described above and connect the resistor 7 of the additional branch 19 parallel to the exciting winding, thus reducing the voltage in said winding.

This branch 6' of the starting unit 6 is disconnected only when the electromagnetic energy of the field of the synchronous machine 5 is completely discharged as current dies out in the circuit of the thyristors 9 of the above mentioned branch 6'. Other branches 6¹ of the starting unit 6 connected parallel to the exciter 1 protect this exciter 1 from overvoltage. Such overvoltage may occur in the exciter 1 in the above described conditions, particularly if the group of transformers 3 which supplies power to the converter 2 of the exciter 1 has current components. Other branches 6' of the starting unit 6 are turned on and off as described above.

The above given modes of operation are in fact normal technological operational conditions of the synchronous machine.

The device for exciting a synchronous machine will operate as follows in case of faulty operation of the thyristor switch 8 (FIG. 1) of the branch 6' of the starting unit 6 (for example in case of breakdown of the thyristor 9). Current flowing through the resistor 7 is now determined by voltage in the exciter 1 and resistance of the resistor 7. The resistor 7 warms up. The heat produced in the resistor 7 is monitored by the thermal contactor functioning as a sensor and within a period determined by the time setting of the thermal contactor its contact closes. A control pulse is sent from the control circuit 13 of the protective thyristor 12 via the commutator 14 to the protective thyristor 12. The protective thyristor 12 becomes conductive and bypasses the branch 6' of the starting unit 6. The short circuit current of the exciter 1 passes through the thyristor 12 and the safety device 11. The safety device 11 blows and cuts the starting unit 6 and the protective thyristor 12 from the exciter 1. The synchronous machine 5 goes on working since the faulty branch 6' is cut off. If the starting unit 6 is composed of several parallel branches 6', disconnection of one such branch in no way impairs the efficiency of operation of the device for exciting a synchronous machine. Other serviceable parallel branches 6' take care of protection of the starting unit 6.

When the control circuit 13 is made as in the embodiment of FIG. 2, the control voltage for the protective thyristor 12 is fed from the resistor 7.

This voltage is produced by the resistor 7 when current flows through the branch 6' of the starting unit 6. Consequently, in case of fault in the starting unit 6 the voltage of the required polarity is produced in the resistor 7 of the faulty branch 6'. This voltage is supplied, when the commutator of the contactor 14 closes, to the control electrode of the protective thyristor 12. The protective thyristor 12 is made conductive and the faulty branch of the starting unit 6 is cut off as described above.

The proposed device for exciting a synchronous machine permits disconnection of the starting unit 6 or its branch 6' in case of faults in the circuits of the starting unit 6 and, consequently, prevention of accidents without cutting off the synchronous machine 5.

When the starting unit 6 has several parallel branches 6', disconnection of a faulty parallel branch 6' of the starting unit 6 insures both uninterrupted operation of the synchronous machine 5 and protection of the exciting device by other branches 6'.

The embodiment of FIG. 2 permits elimination of the control circuit 13 of the protective thyristor 12 and of any external power source for the protective thyristor control circuit. It also ensures fairly reliable separation of circuits connected to the exciting winding 4 from the circuits of the automatic equipment of the synchronous machine.

Moreover, the proposed device permits protection of the exciting winding 4 and the exciter 1 against overvoltages not only when the field discharge contactor 16 is closed (for example during starting, asynchronous operation and the like) but also when the field discharge contactor 16 is disconnected. No additional protective discharger is required in this case. It should be also noted that the power of the starting unit 6 is not increased, since the number of branches and the total volume of the starting unit 6 depend upon the starting operating conditions which account for most of energy produced in the circuits of the starting unit 6, whereas the energy left in the exciting winding after extinction of the arc of the field discharge contactor 16 is significantly less and can be easily dissipated in the branches 6' of the starting unit 6 connected parallel to the exciting winding 4.

What is claimed is:

1. A device for exciting a synchronous machine, comprising:
    an exciter electrically connected to an exciting winding of said synchronous machine;
    a starting unit connected parallel to said exciter and comprising at least one branch composed of a resistor and a thyristor switch placed in series, each branch protecting said exciting winding of said synchronous machine and said exciter against overvoltages during transient operation conditions; and
    a control circuit of said thyristor switch including voltage actuated threshold elements making thyristors of said thyristor switch conductive in order to activate said branch when voltage in said exciting winding exceeds the setting of said threshold element;

at least one safety device connected in series in the circuit of a respective branch of the starting unit and disconnecting said respective branch in case of a fault in said respective branch;

at least one protective thyristor connected parallel to a respective branch of the starting unit to bypass said respective branch in case of a fault in said respective branch;

at least one current sensor of a respective branch of the starting unit connected in said respective branch and having a delayed-action commutator;

at least one control circuit of a respective protective thyristor connected to a control electrode of said respective protective thyristor via a respective delayed-action commutator of said sensor, said control circuit of said protective thyristor producing a control pulse making the protective thyristor conductive when said commutator closes the current flowing in said respective branch of the starting unit increases beyond a permissible level.

2. A device as claimed in claim 1, wherein said control circuit of said respective protective thyristor includes said resistor of a respective branch of said starting unit, said resistor monitoring the current flowing in said respective branch.

3. A device as claimed in claim 1, further comprising: a field discharge contactor for intensified discharge of the electromagnetic energy of said exciting winding of the synchronous machine by maintaining a permanent voltage of an electric arc generated during disconnection of contacts of said field discharge contactor, said field discharge contactor having one output connected to said safety device of one branch of the starting unit, and a second output connected to said safety device of an adjacent branch of the starting unit.

4. A device as claimed in claim 2, further comprising: a field discharge contactor for intensified discharge of electromagnetic energy of said exciting winding of the synchronous machine by maintaining a permanent voltage of an electric arc produced during disconnection of contacts of said field discharge contactor, said field discharge contactor having one output connected to said safety device of one branch of the starting unit, and a second output connected to the safety device of an adjacent branch of the starting unit.

* * * * *